United States Patent
Batra et al.

(10) Patent No.: US 12,211,307 B1
(45) Date of Patent: Jan. 28, 2025

(54) TWO-STAGE BODY POSE ESTIMATION

(71) Applicant: Apple Inc., Cupertino, CA (US)

(72) Inventors: Tanmay Batra, Mountain View, CA (US); Bharath Kumar Comandur Jagannathan Raghunathan, Sunnyvale, CA (US); Stefano Alletto, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 370 days.

(21) Appl. No.: 17/696,728

(22) Filed: Mar. 16, 2022

Related U.S. Application Data

(60) Provisional application No. 63/161,559, filed on Mar. 16, 2021.

(51) Int. Cl.
 *G06V 40/10* (2022.01)
 *G06T 7/70* (2017.01)

(52) U.S. Cl.
 CPC .............. *G06V 40/103* (2022.01); *G06T 7/70* (2017.01); *G06T 2207/20081* (2013.01); *G06T 2207/20084* (2013.01); *G06T 2207/30196* (2013.01)

(58) Field of Classification Search
 CPC .................... G06V 40/103; G06T 7/70; G06T 2207/20081; G06T 2207/20084; G06T 2207/30196
 See application file for complete search history.

(56) References Cited

U.S. PATENT DOCUMENTS

| | | | |
|---|---|---|---|
| 11,278,413 B1* | 3/2022 | Lang | G16H 50/50 |
| 2019/0180473 A1* | 6/2019 | Guleryuz | G06V 40/10 |
| 2019/0320995 A1* | 10/2019 | Amiri | A61B 6/463 |
| 2020/0304729 A1* | 9/2020 | Runia | G06N 3/04 |
| 2021/0201066 A1* | 7/2021 | Cui | G06N 3/04 |

* cited by examiner

*Primary Examiner* — Juan M Guillermety
(74) *Attorney, Agent, or Firm* — Fernando & Partners, LLP

(57) ABSTRACT

In one implementation, a method of body pose estimation is performed at a device including one or more processors and non-transitory memory. The method includes obtaining a plurality of two-dimensional images of a body in a three-dimensional environment at a respective plurality of times. The method includes determining, for each of the plurality of two-dimensional images, the two-dimensional location in the two-dimensional image of one or more joints of the body at the respective plurality of times. The method includes determining, based on the two-dimensional locations, a plurality of three-dimensional locations in the three-dimensional environment of the one or more joints of the body at the respective plurality of times. The method includes determining, based on the three-dimensional locations, a plurality of updated three-dimensional locations in the three-dimensional environment of the one or more joints of the body at the respective plurality of times.

23 Claims, 3 Drawing Sheets

300

At a device including one or more processors and non-transitory memory: — 310

Obtaining a plurality of two-dimensional images of a body in a three-dimensional environment at a respective plurality of times Determining, for each of the plurality of two-dimensional images, the two-dimensional location in the two-dimensional image of one or more joints of the body at the respective plurality of times — 320

Determining, based on the two-dimensional locations, a plurality of three-dimensional locations in the three-dimensional environment of the one or more joints of the body at the respective plurality of times — 330

Determining, based on the three-dimensional locations, a plurality of updated three-dimensional locations in the three-dimensional environment of the one or more joints of the body at the respective plurality of times. — 340

300

| At a device including one or more processors and non-transitory memory: Obtaining a plurality of two-dimensional images of a body in a three-dimensional environment at a respective plurality of times | ←310 |

↓

| Determining, for each of the plurality of two-dimensional images, the two-dimensional location in the two-dimensional image of one or more joints of the body at the respective plurality of times | ←320 |

↓

| Determining, based on the two-dimensional locations, a plurality of three-dimensional locations in the three-dimensional environment of the one or more joints of the body at the respective plurality of times | ←330 |

↓

| Determining, based on the three-dimensional locations, a plurality of updated three-dimensional locations in the three-dimensional environment of the one or more joints of the body at the respective plurality of times. | ←340 |

Figure 3

TWO-STAGE BODY POSE ESTIMATION

CROSS-REFERENCE TO RELATED APPLICATIONS

This application claims priority to U.S. Provisional Patent App. No. 63/161,559, filed on Mar. 16, 2021, which is hereby incorporated by reference in its entirety.

TECHNICAL FIELD

The present disclosure generally relates to systems, methods, and devices for estimating the three-dimensional pose of a body.

BACKGROUND

Human pose estimation is a classic computer vision problem enabling a plethora of applications such as real-time motion capture, activity recognition, human-robot interaction, etc. Deep learning has made significant improvements in accurately determining both two-dimensional and three-dimension human poses in a scene.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 3 is a flowchart representation of a method of body pose estimation in accordance with some implementations.

Figure 1:
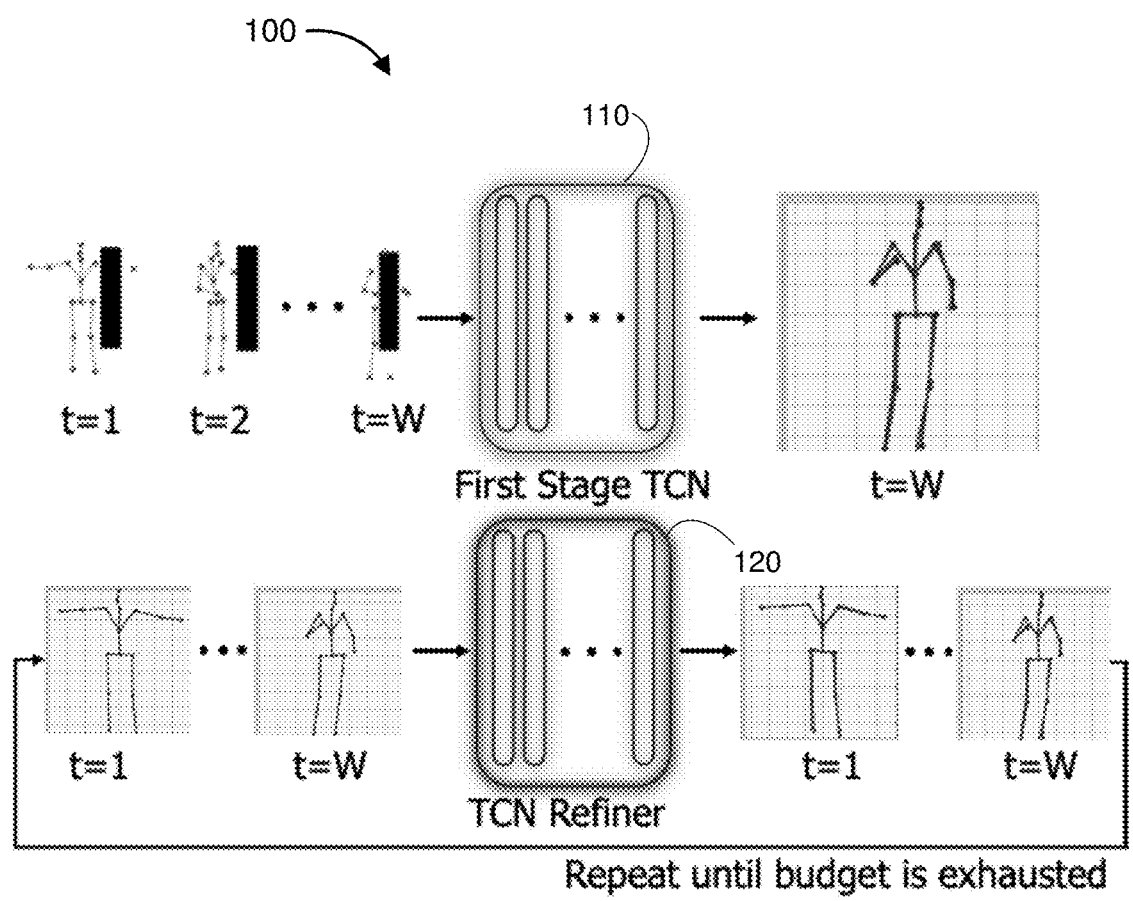
FIG. 1 illustrates a body pose estimator in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for body pose estimation. In various implementations, the method is performed by a device including one or more processors and non-transitory memory. The method includes obtaining a plurality of two-dimensional images of a body in a three-dimensional environment at a respective plurality of times. The method includes determining, for each of the plurality of two-dimensional images, the two-dimensional location in the two-dimensional image of one or more joints of the body at the respective plurality of times. The method includes determining, based on the two-dimensional locations, a plurality of three-dimensional locations in the three-dimensional environment of the one or more joints of the body at the respective plurality of times. The method includes determining, based on the three-dimensional locations, a plurality of updated three-dimensional locations in the three-dimensional environment of the one or more joints of the body at the respective plurality of times.

In accordance with some implementations, a device includes one or more processors, a non-transitory memory, and one or more programs; the one or more programs are stored in the non-transitory memory and configured to be executed by the one or more processors. The one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

It is desirable for body pose estimation to be accurate and robust enough to be used in real-world applications. In various implementations, the jitter of the joints from frame to frame is reduced. In various implementations, temporal inconsistencies effect the perceived quality of a pose more than spatial errors. In various implementations, real-world occlusion scenarios-both self-occlusion as well as occlusion caused by external objects and other people are taken into account. To produce reliable three-dimensional poses, various implementations disclosed herein predict the joints that are not visible in the field of view, and also makes sure that the transition from all joints being visible in one frame to some joints being occluded in the next is smooth and jitter-free. Various implementations disclosed herein produce results that are comparable to other implementations in terms of mean per-joint position error (MPJPE) but reduce the mean per-joint velocity error (MPJVE, the main measure for pose jitter). Furthermore, various implementations disclosed herein have reduced real-world deployment metrics such as runtime, number of parameters, or power consumption as compared to other implementations.

Various implementations disclosed herein work seamlessly on a mobile device in real-time as the networks are highly efficient both in terms of latency and power consumption on mobile devices, reducing runtime and power consumption. Furthermore, in various implementations, mobile devices have limited resources and their availability depends on how many other applications are competing for their usage.

Various implementations disclosed herein include networks which are anytime predictors-without any need for re-training or deployment of multiple models, the networks' sizes and latency can be modified at run-time based on availability of hardware resources.

Methods for three-dimensional pose estimation can be classified into two categories—(1) directly estimating three-dimensional poses from images and (2) estimating two-dimensional poses first and then doing 2D-to-3D lifting to output the final three-dimensional pose. In various implementations, estimation of the two-dimensional poses is performed using existing methods. In various implementations, the lifting is performed with a two-stage neural network.

Various implementations disclosed herein handle occlusions and missing keypoints from the two-dimensional input pose, coping with the issues two-dimensional pose estimation from which it sometimes suffers. Furthermore, its results are temporally consistent and produce smooth poses, an important factor deciding the perceived quality of the results.

In various implementations, body pose estimation is performed with an anytime predictor; as such, without the need to retrain or deploy multiple networks, the system is capable of dynamically adapting its runtime depending on the current load of the device on which it runs. It can produce a rough estimate quickly and further refine its accuracy until the current computational budget is exhausted.

Various implementations disclosed herein are designed for real-world mobile deployment and feature significant reductions in number of parameters, runtimes and power consumption compared to other systems.

Various implementations disclosed herein achieve similar or better spatial errors than other implementations even in the presence of occlusions, and can greatly reduce jitter while still employing a fully causal model, e.g., without using any future information for current frame prediction.

Furthermore, various implementations deployed on real-world mobile devices show that benchmark results also translate to reduced power consumption and runtimes compared to other implementations.

Various implementations of estimating three-dimensional body joints can be divided in two main categories: (1) the approaches directly estimating the three-dimensional pose from an image/video sequence and (2) approaches performing two-dimensional detection first, followed by a lifting step, e.g., inferring the three-dimensional coordinates in a three-dimensional environment space of a set of joints from their two-dimensional coordinates in a two-dimensional image space.

In various implementations, due to the intermediate supervision, two-step methods relying on two-dimensional detection and three-dimensional lifting achieve better performance. In various implementations, a network, given manually annotated two-dimensional joints, predicts a set of three-dimensional joints relying on bone-length priors and 3D-to-2D reprojection. In various implementations, a network estimates two-dimensional body joints and extract three-dimensional features with two separate branches and fuses them together to make a final prediction. In various implementations, a network includes a LSTM module to lift a set of two-dimensional keypoints estimated by an earlier stage.

In various implementations, temporal information is considered to further improve the lifting performance. For example, in various implementations, a network relies on temporal convolutional networks (TCN) to predict three-dimensional coordinates from a window of two-dimensional poses obtained from adjacent video frames. In various implementations, a network includes a TCN model including multiple residual blocks. By leveraging the information available in a contiguous window of two-dimensional poses and relying on 3D-to-2D reprojection as further supervision, various implementations show significantly improved results over single-frame methods. In various implementations, a network includes an attention mechanism added to the TCN.

A major issue when tackling pose estimation is the presence of occlusions, either caused by other body-parts (self-occlusions) or objects in the scene. Various implementations do not take this into account and often rely on some sort of manually annotated inputs, e.g., ground-truth two-dimensional detections.

While various three-dimensional pose estimation datasets lack annotation about occlusions, various implementations explicitly take this issue into account. For example, in various implementations, a network uses adversarial training to improve the performance in the presence of occlusion by having a generator predict both three-dimensional poses and occlusion heatmaps and a discriminator trained to distinguish between plausible and fake poses.

In various implementations, a cylindrical model of the human body is used to generate synthetic self-occlusions during training time and multiple TCNs are used to predict the final three-dimensional pose. However, in various implementations, the cylindrical model provides robustness against self-occlusions, while occlusions resulting from objects in the scene still pose a challenge. In various implementations, keypoints are randomly masked during training to provide occlusion data augmentation. However, in various implementations, this does not produce realistic data due to the temporal nature of occlusion. In various implementations, lacking ground-truth annotation for occlusion, evaluating the performance of explicit occlusion handling is often difficult.

With computer vision reaching its maturity and pose estimation algorithms being used in real-world applications on mobile devices, being capable of anytime prediction is an important advantage. At inference time, a method capable of anytime prediction first produces a quick rough prediction, and then proceeds to refine it until its test-time computational budged is exhausted. This may be particularly important when running on mobile devices where the inference budget can greatly vary depending on resource demand and power profiles. In various implementations, multiple networks with different computational footprints are used to achieve this. However, in various implementations, an anytime predictor could potentially change its behavior at each test sample without knowing the inference conditions in advance.

In various implementations, a body pose estimator includes temporal convolutional networks (TCNs) to reduce jitter and improve the temporal consistency of the estimated three-dimensional poses.

FIG. 1 illustrates a body pose estimator 100 in accordance with some implementations. The body pose estimator 100 includes a first stage 110 and a second stage 120. In various implementations, the first stage 110 is a TCN that accepts a window of two-dimensional poses as input and outputs three-dimensional poses. In various implementations, the outputs of the first stage 110 are passed to the second stage 120 which is a temporal refiner network that improves the estimated three-dimensional poses. Thus, the body pose estimator 110 disentangles the three-dimensional lifting and occlusion-solving from the enforcement of temporal consistency.

Figure 2:
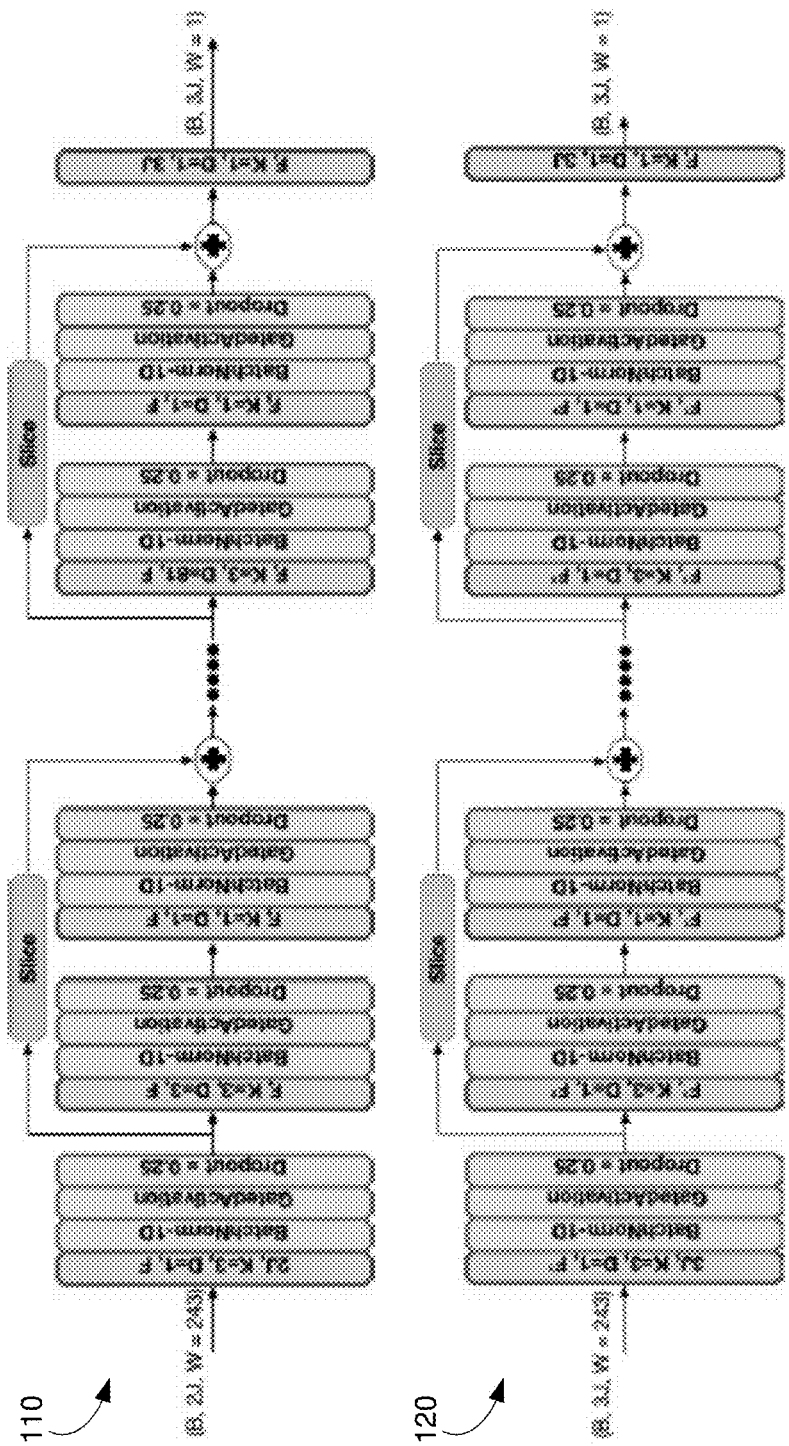
FIG. 2 illustrates the first stage and the second stage of FIG. 1 in accordance with some implementations.

FIG. 2 illustrates the first stage 110 and the second stage 120 in accordance with some implementations. Let B denote the minibatch size and J denote the number of joints in the two-dimensional pose. For a single input frame $I_t$ at time t, the two-dimensional coordinates of the J joints are concatenated to create an input vector $V_t$ of length 2J. The corresponding three-dimensional ground truth pose $G_t$ will be of length 3J. To predict the three-dimensional pose $P'_t$ at time t, an input window is created by stacking together W such vectors. In the causal case, the past W frames are used, e.g., $\{V_{t-(W-1)}, V_{t-(W-2)}, \ldots, V_t\}$ and in the non-causal case we use both past and future frames, e.g., $\{V_{t-(W-1)/2}, V_{t-(W-3)/2}, \ldots V_t, V_{t+(W+1)/2}\}$. In various implementations, the input sequences are padded by replicating the boundary frames to ensure the same length for the input and the output sequences.

In various implementations, the first stage 110 is a dilated TCN. At the first layer, the input is convolved with F filters, each with a kernel of size K. The outputs of this layer are passed through N consecutive residual blocks. In various implementations, the ith residual block $R_i$ includes two parts—1) a 1D convolution with a dilation factor $D=K_i$ and kernel size=K followed by a batch normalization (BN) layer, a gated activation unit and a dropout layer and 2) a 1D convolution with kernel size=1 followed by a BN layer, a gated activation unit and a dropout layer. In various implementations, the dilation ensures that the receptive field increases exponentially with each $R_i$.

In various implementations, the values of K, N, and D are set so that the final receptive field covers all the input frames. In various implementations, at the last step, a fully connected layer is used to output the three-dimensional pose. For an input of shape (B; 2J; W), the first stage TCN produces an output of shape (B; 3J; 1).

In various implementations, using the first stage 110 alone may not be suited for mobile devices especially when having a large number of filters. In various implementations, in the realistic causal scenario, it only considers the past W frames and therefore exhibits more jitter which is especially pronounced when joints are occluded for a time period greater than W frames. Further, the first stage 110 alone does not use the previously predicted poses to improve its temporal consistency. However, in various implementations, these drawbacks are alleviated by the second stage 120.

In various implementations, poses output by the first stage for W consecutive frames are stacked together and input to the second stage 120. In various implementations, the second stage 120 is a TCN. The second stage 120 includes H refiner blocks with skip connections. In various implementations, each block is similar to the first stage 110 blocks with a few differences. In various implementations, the dilation for all convolutional layers is set to 1. Therefore, for an input of shape (B; 3J; W), the second stage 120 produces an output of shape (B; 3J; W). In various implementations, the number of filters is smaller when compared to the number of filters in the first stage 110. In various implementations, weights and biases are shared by the H refiner blocks and thus, the second stage 120 only adds a small memory footprint which does not depend from the number of blocks used. In various implementations, at inference time, the network is trained with parameter sharing between its refiner blocks and a subset of the H blocks can be used only depending upon resource and power constraints, effectively rendering the network an anytime predictor.

In various implementations, the second stage 120 allows for significant reduction of the number of filters in the first stage 110. For example, in various implementations, the corresponding increase in the error of the first stage 110 from using fewer filters is offset by the refinement of the second stage 120.

In various implementations, the first stage 110 is trained using a mean-squared error (MSE) loss computed over the three-dimensional coordinates of the joints. Where $G_t$ denotes the ground-truth three-dimensional pose and $P^I_t$ denotes the pose predicted by the first stage 110 at time t. For a minibatch of size B, the first stage loss is computed as:

$$L^1_{MSE} = \sum_B (\|P^I_t - G_t\|)^2 \quad (1)$$

In various implementations, Equation 1 lifts two-dimensional keypoints to three-dimensional coordinates and generates joints missing due to occlusions or failures of the two-dimensional detector.

In various implementations, the second stage 120 is trained using a weighted combination of two losses, a MSE loss and a mean squared velocity error (MSVE) loss. In various implementations, the MSVE loss is determined with an approximation of the velocity using the first derivative. In various implementations, where $P^{II}_t$ denotes the pose predicted by the second stage 120 at time t, the MSVE loss is computed as:

$$L^{I1}_{MSVE} = \sum_B \sum_t^{t+W-1} (\|P^{I1}_t - P^{I1}_{t-1}\| - (G_t - G_{t-1})\|)^2 \quad (2)$$

Thus, in various implementations, where $\alpha$ and $\beta$ are hyperparameters, the total loss for the second stage 120 is computed as:

$$L^{I1} = \alpha \cdot L^{I1}_{MSVE} + \sum_B \sum_t^{t+W-1} \beta \cdot (\|P^{I1}_t - G_t\|)^2 \quad (3)$$

Thus, the loss function corrects both spatial and temporal errors, further refining the three-dimensional poses in the spatial domain and introducing explicit temporal consistency.

Occluded joints are quite common in real-world scenarios. In general, there are two kinds of occlusion—self-occlusion where some joints are occluded due to the relative orientation between the human and the camera, and external occlusion caused by other objects in the scene. In various implementations, joints could be missing simply due to the failure of the two-dimensional detector following a complex pose, or part of the body could be out of the camera field-of-view.

In various implementations, the body pose estimators learns to correctly generate missing joints in such scenarios. To that end, synthetic external occlusions are introduced into the training dataset.

In various implementations, occlusions are introduced in the form of horizontal or vertical boxes. In various implementations, occlusions are circular or other shapes. For each sequence of length W, occlusions are introduced either at the start or at the end of the sequence, e.g., to mimic the scenarios where a subject gradually gets occluded as they move behind an external object or where the joints of a subject gradually become visible as they move out from behind an object and also to avoid cases where the person is never occluded by the synthetic box or is it fully hidden by it.

Where p denotes the hyperparameter used to control the degree of occlusion, $I_{s,e} = \{I_s, I_{s+1}, \ldots, I_e\}$ indicates the set of consecutive frames for which the occlusion will be introduced, X and Y respectively denote the pixel row and column coordinates, $X_{min}$ and $Y_{min}$ respectively denote the minimum values of the joint coordinates over $I_{s,e}$, and $X_{max}$ and $Y_{max}$ respectively denote the maximum values of the joint coordinates over $I_{s,e}$, R denotes a bounding box with $(X_{min}, Y_{min})$ as its top left corner and $(X_{max}, Y_{max})$ as its bottom right corner. The bounding box R represents the location of the subject over $I_{s,e}$. The position, width, and height of an occluding box O are chosen such that it covers a portion of R. The extent of overlap between O and R is controlled by p.

In various implementations, vertical and horizontal boxes are randomly chosen by controlling the aspect ratio. In various implementations, occlusions are not applied if there are no visible joints in $I_{s,e}$. Thus, realistic and temporally consistent occlusions are introduced. Furthermore, in various implementations, due to the way the box O is chosen, frames without occlusions can be present, providing balanced training data.

In various implementations, in addition to masking out the occluded joints, an extra binary channel is added to each input frame. This binary channel contains '0's for the occluded joints and '1's for the visible joints and serves as an explicit occlusion indicator for the network. At inference time, the two-dimensional detector confidence can be thresholded and used for this purpose.

In various implementations, the synthetic occlusion generation process generates rectangles over the images. In various implementations, the masking is performed over the joints. This allows a body pose estimator trained on this data to generalize to various situations where joints are missing.

In various implementations, the body pose estimator 100 is trained two steps. In various implementations, in the first step, the first stage 110 is trained separately for 80 epochs with the $L^J_{MSE}$ loss function of Equation (1), the Adam optimizer and a learning rate of 0.001. In various implementations, the momentum of the BN layers is decreased with every epoch. In various implementations, to reduce the correlation between the training samples, the first stage 110 is trained to predict one output frame at a time. In various implementations, this is done by replacing the dilated temporal convolutions with strided convolutions where the stride is set equal to the dilation factor. After training, the network weights are copied to a TCN with dilated convolutions, which can predict multiple frames at once by efficiently using the intermediate states.

In the second step, the weights of the first stage 110 (with dilated convolutions) are frozen and the second stage 120 is trained with the $L^H$ loss function of Equation (3) and the Adam optimizer for 80 more epochs, with the same learning rate as the first stage 110 decayed at each epoch with a decay of 0.95. In various implementations, the momentum of the BN layers is also decayed with every epoch.

In various implementations, occlusion is introduced on the fly during training as a data augmentation step.

FIG. 3 is a flowchart representation of a method 300 of estimating the pose of a body in accordance with some implementations. In various implementations, the method 300 is performed by a first device including a display, one or more processors, and non-transitory memory (e.g., the electronic device 120 of FIG. 3). In some implementations, the method 300 is performed by processing logic, including hardware, firmware, software, or a combination thereof. In some implementations, the method 300 is performed by a processor executing instructions (e.g., code) stored in a non-transitory computer-readable medium (e.g., a memory).

The method 300 begins, in block 310, with the device obtaining a plurality of two-dimensional images of a body in a three-dimensional environment at a respective plurality of times. For example, in various implementations, the device obtains a video of a person.

The method 300 continues, in block 320, with the device determining, for each of the plurality of two-dimensional images, the two-dimensional location in the two-dimensional image of one or more joints of the body at the respective plurality of times. In various implementations, the device determines, for each joint, the X and Y pixel coordinates of the joint and a label for the joint. For example, in various implementations, the device determines the pixel coordinates of a knee of the body at each of the respective plurality of times.

The method 300 continues, in block 330, with the device determining, based on the two-dimensional locations, a plurality of three-dimensional locations in the three-dimensional environment of the one or more joints of the body at the respective plurality of times. In various implementations, the device determines, for each joint, X, Y, and Z coordinates in a three-dimensional coordinate system of the three-dimensional environment. For example, in various implementations, the device determines the three-dimensional coordinates of the knee of the body at each of the respective plurality of times.

In various implementations, determining the plurality of three-dimensional locations includes applying a first neural network to the two-dimensional locations. For example, in various implementations, the two-dimensional locations are provided to the first stage 110 to generate the three-dimensional locations.

In various implementations, the first neural network is trained on data including joint occlusions. For example, in various implementations, joints within an area of the images used as training data are masked.

The method 300 continues, in block 340, with the device determining, based on the three-dimensional locations, a plurality of updated three-dimensional locations in the three-dimensional environment of the one or more joints of the body at the respective plurality of times. In various implementations, determining the plurality of updated three-dimensional locations includes applying a second neural network to the three-dimensional locations. For example, in various implementations, the three-dimensional locations are provided to the second stage 120 to generate the updated three-dimensional locations.

In various implementations, determining the plurality of updated three-dimensional locations includes applying the second neural network to the three-dimensional locations iteratively a number of times. For example, in various implementations, the output of the second stage 120 is provided as an input to the second stage 120 a number of times.

In various implementations, the number of times is based on a computational budget. For example, in various implementations, the number of times is based on an amount of available processing time or available processing power.

In various implementations, the second neural network is trained on a loss function including a position term and a velocity term. For example, in various implementations, the second stage 120 is trained using the loss function of Equation (3) which includes the velocity term of Equation (2).

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at a device including one or more processors and non-transitory memory:
      capturing, via a camera, a plurality of two-dimensional images of a body in a three-dimensional environment at a respective plurality of times;
      determining, for each of the plurality of two-dimensional images, two-dimensional locations in the two-dimensional image of one or more joints of the body at the respective plurality of times;
      determining, based on the two-dimensional locations, a plurality of three-dimensional location values in the three-dimensional environment of the one or more joints of the body at the respective plurality of times; and
      modifying the plurality of three-dimensional location values to generate a plurality of updated three-dimensional location values in the three-dimensional environment of the one or more joints of the body at the respective plurality of times.

2. The method of claim 1, wherein determining the plurality of three-dimensional location values includes applying a first neural network to the two-dimensional locations.

3. The method of claim 2, wherein the first neural network is trained on data including joint occlusions.

4. The method of claim 2, wherein determining the plurality of updated three-dimensional location values includes applying a second neural network to the three-dimensional location values.

5. The method of claim 4, wherein determining the plurality of updated three-dimensional location values includes applying the second neural network to the three-dimensional location values iteratively a number of times.

6. The method of claim 5, wherein the number of times is based on a computational budget.

7. The method of claim 4, wherein the second neural network is trained on a loss function including a position term and a velocity term.

8. The method of claim 1, wherein modifying the plurality of three-dimensional location values comprises:
   temporally refining the plurality of three-dimensional location values so that the plurality of updated three-dimensional location values has a greater temporal consistency than the plurality of three-dimensional location values.

9. A device comprising:
   a non-transitory memory; and
   one or more processors to:
      capture, via a camera, a plurality of two-dimensional images of a body in a three-dimensional environment at a respective plurality of times;
      determine, for each of the plurality of two-dimensional images, two-dimensional locations in the two-dimensional image of one or more joints of the body at the respective plurality of times;
      determine, based on the two-dimensional locations, a plurality of three-dimensional location values in the three-dimensional environment of the one or more joints of the body at the respective plurality of times; and
      modify the three-dimensional location values to generate a plurality of updated three-dimensional location values in the three-dimensional environment of the one or more joints of the body at the respective plurality of times.

10. The device of claim 9, wherein the one or more processors are to determine the plurality of three-dimensional location values by applying a first neural network to the two-dimensional locations.

11. The device of claim 10, wherein the first neural network is trained on data including joint occlusions.

12. The device of claim 10, wherein the one or more processors are to determine the plurality of updated three-dimensional location values by applying a second neural network to the three-dimensional location values.

13. The device of claim 12, wherein the one or more processors are to determine the plurality of updated three-dimensional location values by applying the second neural network to the three-dimensional location values iteratively a number of times.

14. The device of claim 13, wherein the number of times is based on a computational budget.

15. The device of claim 12, wherein the second neural network is trained on a loss function including a position term and a velocity term.

16. The device of claim 9, wherein modifying the plurality of three-dimensional location values comprises:
temporally refining the plurality of three-dimensional location values so that the plurality of updated three-dimensional location values is less jittery than the plurality of three-dimensional location values.

17. A non-transitory computer-readable medium having instructions encoded thereon, which when executed by one or more processors of a device, cause the device to:
capture, via a camera, a plurality of two-dimensional images of a body in a three-dimensional environment at a respective plurality of times;
determine, for each of the plurality of two-dimensional images, two-dimensional locations in the two-dimensional image of one or more joints of the body at the respective plurality of times;
determine, based on the two-dimensional locations, a plurality of three-dimensional location values in the three-dimensional environment of the one or more joints of the body at the respective plurality of times; and
modify the plurality of three-dimensional location values to generate a plurality of updated three-dimensional location values in the three-dimensional environment of the one or more joints of the body at the respective plurality of times.

18. The non-transitory computer-readable medium of claim 17, wherein instructions cause the device to determine the plurality of three-dimensional location values by applying a first neural network to the two-dimensional locations.

19. The non-transitory computer-readable medium of claim 18, wherein the first neural network is trained on data including joint occlusions.

20. The non-transitory computer-readable medium of claim 18, wherein the instructions cause the device to determine the plurality of updated three-dimensional location values by applying a second neural network to the three-dimensional location values.

21. The non-transitory computer-readable medium of claim 20, wherein the instructions cause the device to determine the plurality of updated three-dimensional location values by applying the second neural network to the three-dimensional location values iteratively a number of times.

22. The non-transitory computer-readable medium of claim 20, wherein the second neural network is trained on a loss function including a position term and a velocity term.

23. The non-transitory computer-readable medium of claim 17, wherein modifying the plurality of three-dimensional location values comprises:
utilizing a temporal refiner to temporally refine the plurality of three-dimensional location values so that the plurality of updated three-dimensional location values has less jitter and greater temporal consistency than the plurality of three-dimensional location values.

* * * * *